(12) United States Patent
Whiteman

(10) Patent No.: US 12,331,793 B2
(45) Date of Patent: Jun. 17, 2025

(54) DRIVE MECHANISM FOR A FOUR WHEEL DRIVE ELECTRIFIED VEHICLE

(71) Applicant: Deere & Company, Moline, IL (US)

(72) Inventor: Steven R. Whiteman, Dubuque, IA (US)

(73) Assignee: Deere & Company, Moline, IL (US)

( * ) Notice: Subject to any disclaimer, the term of this patent is extended or adjusted under 35 U.S.C. 154(b) by 196 days.

(21) Appl. No.: 18/125,172

(22) Filed: Mar. 23, 2023

(65) Prior Publication Data
US 2024/0318693 A1    Sep. 26, 2024

(51) Int. Cl.
| | | |
|---|---|---|
| *F16D 48/02* | (2006.01) | |
| *B60K 17/342* | (2006.01) | |
| *E02F 9/20* | (2006.01) | |
| *F16D 21/08* | (2006.01) | |
| *F16D 25/0638* | (2006.01) | |
| *F16D 25/10* | (2006.01) | |
| *B60K 17/02* | (2006.01) | |

(52) U.S. Cl.
CPC ............ *F16D 25/14* (2013.01); *B60K 17/342* (2013.01); *E02F 9/202* (2013.01); *F16D 21/08* (2013.01); *F16D 25/0638* (2013.01); *F16D 25/10* (2013.01); *B60K 17/02* (2013.01)

(58) Field of Classification Search
CPC ............ F16D 25/0635; F16D 25/0638; F16D 25/063; F16D 25/10; F16D 21/08
USPC ....................................................... 192/48.61
See application file for complete search history.

(56) References Cited

U.S. PATENT DOCUMENTS

| | | | |
|---|---|---|---|
| 2,204,499 A | * | 6/1940 | Kattwinkel ............. F16D 21/08 192/111.15 |
| 4,939,400 A | | 7/1990 | Matsushita et al. |
| 10,442,462 B2 | | 10/2019 | Higuchi et al. |
| 10,829,906 B2 | | 11/2020 | Whiteman |

(Continued)

FOREIGN PATENT DOCUMENTS

| | | |
|---|---|---|
| CN | 1752725 A | 3/2006 |
| CN | 114754086 A | 7/2022 |

(Continued)

OTHER PUBLICATIONS

German Search Report issued in application No. 102024101804.6 dated Oct. 17, 2024, 12 pages.

(Continued)

*Primary Examiner* — Timothy Hannon
(74) *Attorney, Agent, or Firm* — Taft Stettinius & Hollister LLP; Stephen F. Rost

(57) ABSTRACT

A rear mechanism for a work machine includes first and second spring housings operably engaged by one or more springs. The first and second spring housings are assembled with an endcap housing between first and second clutch packs that engage a rear axle of the work machine. A first cavity is formed between the first and second spring housing, and a second cavity is formed between the first housing and the endcap housing. Pressurizing the first cavity compresses the springs and releases a park brake of the work machine to enable front wheel drive of the work machine. While pressurizing the first cavity, the second cavity is pressurized such that the first spring housing compresses the first clutch pack to enable four wheel drive of the work machine.

8 Claims, 16 Drawing Sheets

(56) References Cited

U.S. PATENT DOCUMENTS

| | | |
|---|---|---|
| 2012/0103751 A1 | 5/2012 | Ikeda et al. |
| 2016/0215829 A1* | 7/2016 | Vogel ................... F16D 21/08 |
| 2020/0259370 A1 | 8/2020 | Ichikawa et al. |
| 2020/0264060 A1 | 8/2020 | Venzal |

FOREIGN PATENT DOCUMENTS

| | | |
|---|---|---|
| JP | 2018-160605 A | 10/2018 |
| WO | WO 2024110399 A1 | 5/2024 |

OTHER PUBLICATIONS

Extended European Search Report and Written Opinion issued in European Patent Application No. 23161004.9, dated Oct. 24, 2023, in 10 pages.

* cited by examiner

DRIVE MECHANISM FOR A FOUR WHEEL DRIVE ELECTRIFIED VEHICLE

FIELD OF THE DISCLOSURE

The disclosure relates to skid-steer loaders and more specifically skid-steer loaders having an improved drive mechanism.

BACKGROUND OF THE DISCLOSURE

Skid-steer loaders or small four wheel drive vehicles are driven by right and left hydrostatic motors that are operably coupled with right and left hydrostatic pumps. The right and left hydrostatic pumps are operably coupled with an engine that is often positioned rearwardly of the right and left hydrostatic motors relative to right and left front axles. In particular, the right hydrostatic motor drives a right front axle and a right rear axle. Similarly, the left hydrostatic motor drives a left front axle and a left rear axle.

As technology has evolved, electric loaders have gained popularity due to elimination or reduction of usage of oil. Electric skid-steer loaders are similar to skid-steer loaders however the engine in the skid-steer loader is replaced with a battery for the electric loader to thereby eliminate the usage of oil. The right and left hydrostatic motors in the skid-steer loader are replaced with right and left electric motors for the electric loader. One caveat to account with usage of right and left electric motors is that an electric motor typically spins faster than a hydrostatic motor therefore a greater speed reduction is needed from the electric motor to an axle gear as compared to hydrostatic motors.

Thus there is a need for improvement for skid-steer loaders.

SUMMARY

According to one embodiment of the present disclosure, a rear clutch mechanism mounted on a rear axle shaft of a work vehicle, the rear clutch mechanism comprising: a first clutch pack configured for operable engagement with the rear axle shaft; a second clutch pack configured for operable engagement with the rear axle shaft; a first spring housing assembled with a second spring housing, wherein the first and second spring housings are configured to move relative to each other, the first spring housing positioned adjacent the first clutch pack, the second spring housing positioned adjacent the second clutch pack; a first cavity defined between the assembled first and second spring housings, the first cavity fluidly connected to a hydraulic hose to receive hydraulic fluid to increase hydraulic pressure therein; and when the first cavity contains hydraulic fluid, the first spring housing moves away from the first clutch pack and the second spring housing moves away from the second clutch pack such that the first and second clutch packs are released from operable engagement with the rear axle shaft.

In one example, wherein the first and the second spring housings together form a first spring recess configured to receive a first spring; when the first cavity does not contain hydraulic fluid, the first spring is in an active state to push the first and second spring housings, respectively, against the first and second clutch packs, respectively, such that the first and second clutch packs are in operable engagement with the rear axle shaft; and when the first cavity does contain hydraulic fluid, the first spring is compressed by the first and second spring housings.

In another example, further comprising: an endcap housing assembled with the first and the second spring housings, wherein the endcap housing defines a spring release port configured to receive hydraulic fluid from the hydraulic hose, the spring release port is fluidly connected to the first cavity.

In another example, further comprising: a second cavity defined between the second spring housing and the endcap housing, wherein the endcap housing defines a clutch apply port configured to receive hydraulic fluid from the hydraulic hose, the clutch apply port is fluidly connected to the second cavity; and when the second cavity contains hydraulic fluid, the first spring housing compresses the first clutch pack such that the first clutch pack is in operable engagement with the rear axle shaft such that force is transmitted between the rear axle shaft and the first clutch pack.

In another example, wherein the first and the second spring housings are configured to move relative to the endcap housing.

In another example, further comprising: wherein the first spring housing defines a second spring recess; and a second spring is positioned in the second spring recess.

In another example, wherein the first spring housing includes a first annular wall that extends between a first rim and a second rim, the first annular wall defines the second spring recess, wherein the first rim is arranged to engage the first clutch pack.

In another example, wherein the second spring housing includes a first annular wall that extends perpendicular to a second annular wall, wherein the first annular wall includes a second rim, wherein the second rim is arranged to engage the first spring, and the first annular wall is arranged to engage the second clutch pack.

According to another embodiment of the present disclosure, a rear clutch mechanism mounted on a rear axle shaft of a work vehicle, the rear clutch mechanism comprising: a first clutch pack configured for operable engagement with the rear axle shaft; a first spring housing assembled with a second spring housing, the first spring housing positioned adjacent the first clutch pack; a first cavity defined between the assembled first and second spring housings, the first cavity fluidly connected to a hydraulic hose to receive hydraulic fluid to increase hydraulic pressure therein; an endcap housing assembled with the first and the second spring housings, wherein the first and second spring housings are movable relative to the endcap housing; a second cavity defined between the second spring housing and the endcap housing, the second cavity fluidly connected to a hydraulic hose to receive hydraulic fluid to increase hydraulic pressure therein; when the first cavity contains hydraulic fluid, the first and second spring housings are movable relative to each other to release the first clutch pack from operable engagement with the rear axle shaft; and when the second cavity contains hydraulic fluid, the first and second spring housings are movable relative to the endcap housing to compress the first clutch pack in operable engagement with the rear axle shaft such that force is transmitted between the rear axle shaft and the first clutch pack.

In one example, wherein the endcap housing defines a spring release port configured to receive hydraulic fluid from the hydraulic hose and the spring release port is fluidly connected to the first cavity; and wherein the endcap housing defines a clutch apply port configured to receive hydraulic fluid from the hydraulic hose and the clutch apply port is fluidly connected to the second cavity.

In one example, wherein the second spring housing nests within the first spring housing.

In one example, further comprising: a second clutch pack configured for operable engagement with the rear axle shaft, the second spring housing positioned adjacent the second clutch pack; and when the first cavity contains hydraulic fluid, the first and second spring housings are movable relative to each other to release the second clutch pack from operable engagement with the rear axle shaft.

In one example, wherein the first and the second spring housings together form a first spring recess configured to receive a first spring; when the first cavity does not contain hydraulic fluid, the first spring is in an active state to push the first and second spring housings, respectively, against the first and second clutch packs, respectively, such that the first and second clutch packs are in operable engagement with the rear axle shaft; and when the first cavity contains hydraulic fluid, the first spring is compressed by the first and second spring housings.

In one example, further comprising: wherein the first spring housing defines a second spring recess; and a second spring is positioned in the second spring recess, the second spring is in an active state to push the first and second spring housings, respectively, against the first and second clutch packs, respectively, such that the first and second clutch packs are in operable engagement with the rear axle shaft.

In one example, wherein the first spring housing includes a first annular wall that extends between a first rim and a second rim, the first annular wall defines the second spring recess, wherein the first rim is arranged to engage the first clutch pack.

In one example, wherein the second spring housing includes a first annular wall that extends perpendicular to a second annular wall, wherein the first annular wall includes a second rim, wherein the second rim is arranged to engage the first spring, and the first annular wall is arranged to engage the second clutch pack.

In one example, wherein the endcap housing defines a spring release port configured to receive hydraulic fluid from the hydraulic hose; wherein the first annular wall includes a plurality of first spring housing holes arranged such that one of the first spring housing holes aligns with the spring release port that is operably connected to a hydraulic hose to supply hydraulic fluid and pressure to the first cavity.

According to another embodiment of the present disclosure, a drive assembly for a work vehicle having a front axle independently operable from a rear axle, the drive assembly comprising: a front drive sprocket having a plurality of teeth; a gear box mounted on the front axle of the work vehicle, the gear box operably engaged with the front drive sprocket to rotate the front drive sprocket; and a chain assembled with the plurality of teeth of the front drive sprocket and a rear drive sprocket that is assembled with the rear axle of the work vehicle, wherein operation of the chain thereby rotates the rear drive sprocket by engaging a plurality of teeth on the rear drive sprocket.

In one example, further comprising: an electric motor operably coupled to the gear box.

In one example, wherein the gear box is configured to rotate the front axle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
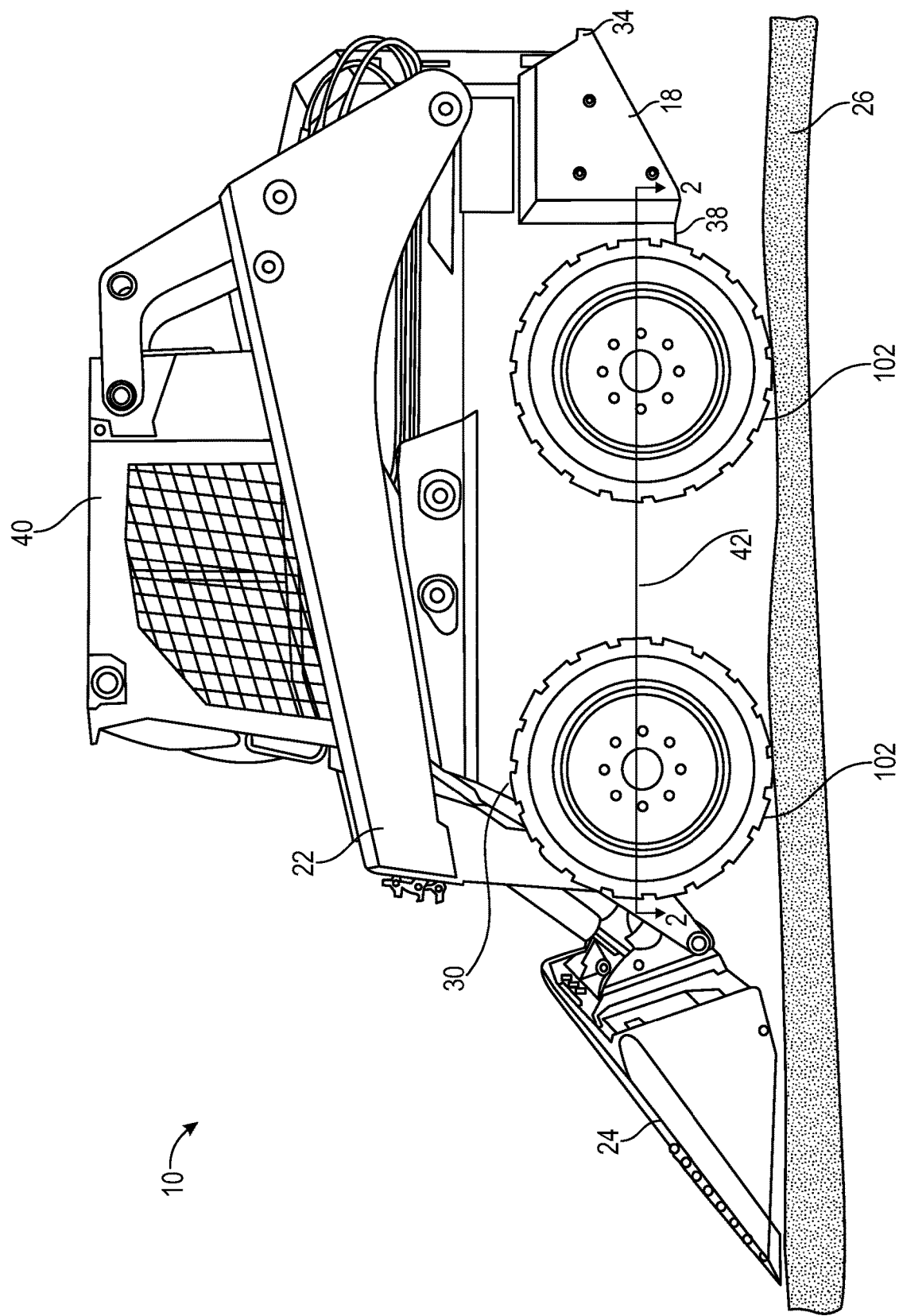
FIG. 1 is a side view of a skid-steer loader.

FIG. 1 illustrates a skid-steer loader 10 having an improved drive mechanism 14. More specifically, the improved drive mechanism 14 is configured to provide multiple speed ranges for an electric skid steer vehicle without the deficiencies inherent in hydrostatic motors. For example, the drive mechanism 14 allows for the use of an electric motor in place of a hydrostatic motor. Further, the drive mechanism 14 eliminates free-wheeling, provides better stability, and provides better traction for turning or steering on a hard or rigid surface such as concrete. The drive mechanism 14 also includes a single chain on each side of the vehicle allowing for a narrower vehicle overall and more room under the cab. The drive mechanism 14 allows for multiple modes of operation that include parked (mode one), front wheel drive (mode two), and four wheel drive (mode three). Additionally, the drive mechanism 14 allows for the four wheel drive mode of operation or mode three to include a medium mode of operation and a high mode of operation.

The loader 10 includes a body 18, a lift arm 22 coupled to and movable relative to the body 18, and a drive mechanism 14 coupled to the body 18 and configured to maneuver the loader 10 over a support surface 26 (e.g., the ground). In the illustrated implementation, the body 18 of the loader 10 includes a forward end 30, a rear end 34 opposite the forward end 30, a bottom plate or pan 38, and a roll-cage 40 at least partially enclosing a cab therein. The body 18 of the loader 10 also includes a pair of side rails 42, each extending from the pan 38 and oriented along the length of the loader 10 between the forward end 30 and the rear end 34.

Illustrated in FIG. 1, the lift arm 22 of the loader 10 is pivotably coupled to the body 18 proximate the rear end 34 and configured to rotate about a substantially horizontal axis between a lowered position and a raised position. In the illustrated implementation, the lift arm 22 includes a bucket 24 pivotably coupled to the distal end thereof that is configured to scoop and collect material. While the illustrated loader 10 includes a bucket, it is well known in the art for such loaders 10 to be adaptable to include a wide variety of labor-saving tools and attachments such as trenching tools, augers, snow blowers, and the like (not shown).

Figure 2:
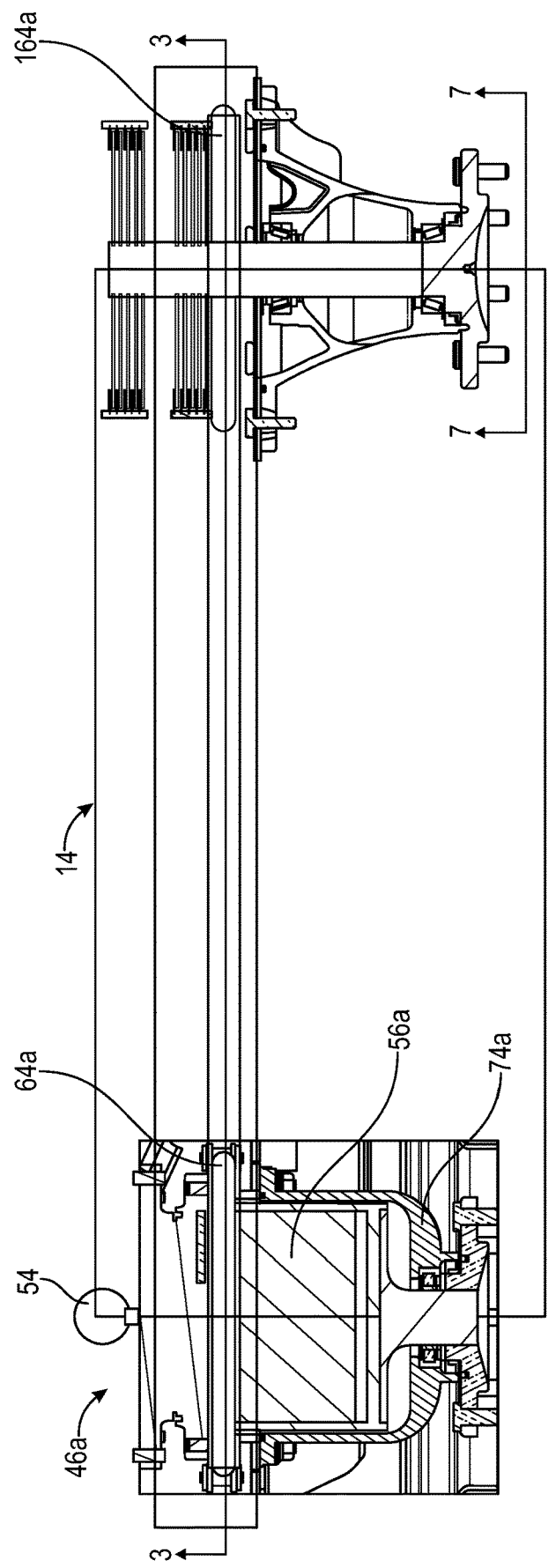
FIG. 2 is a section view taken along line 2-2 of FIG. 1.
Figure 3:
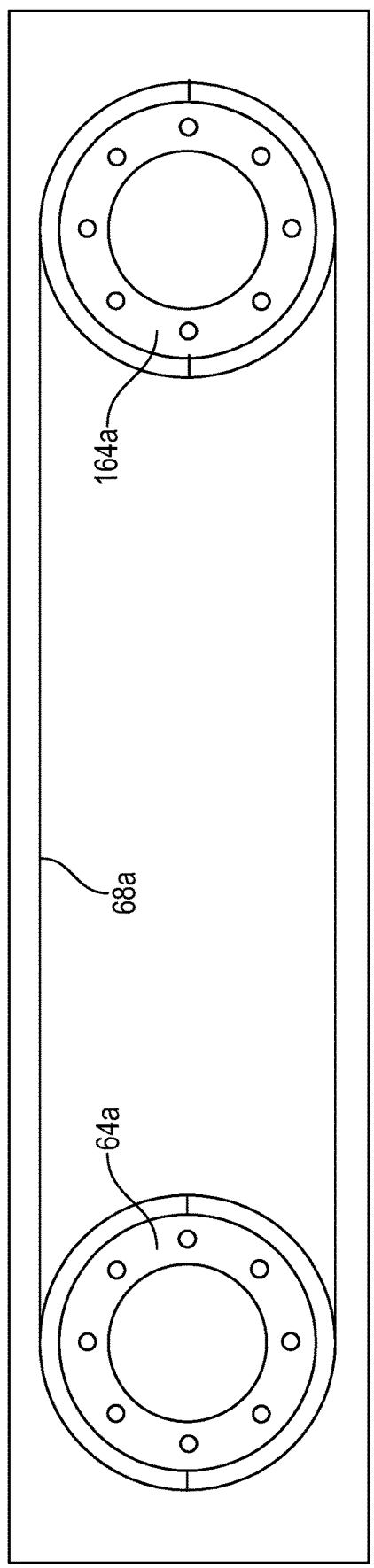
FIG. 3 is a schematic view of a left side chain case of a first drive assembly of the skid-steer loader of FIG. 1.
Figure 4:
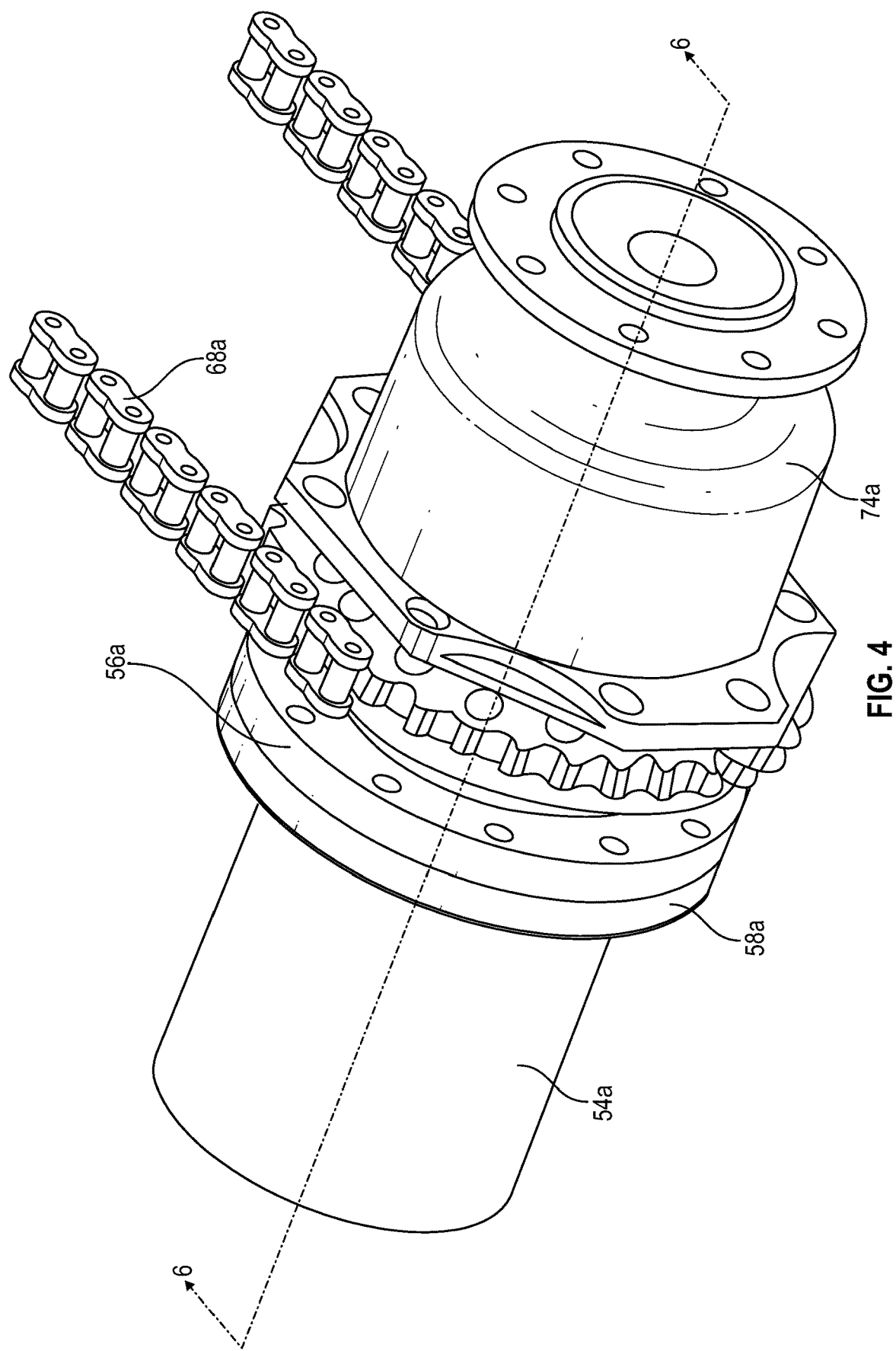
FIG. 4 is a partial side perspective view of the front axle of the first drive assembly of FIG. 3.
Figure 5:
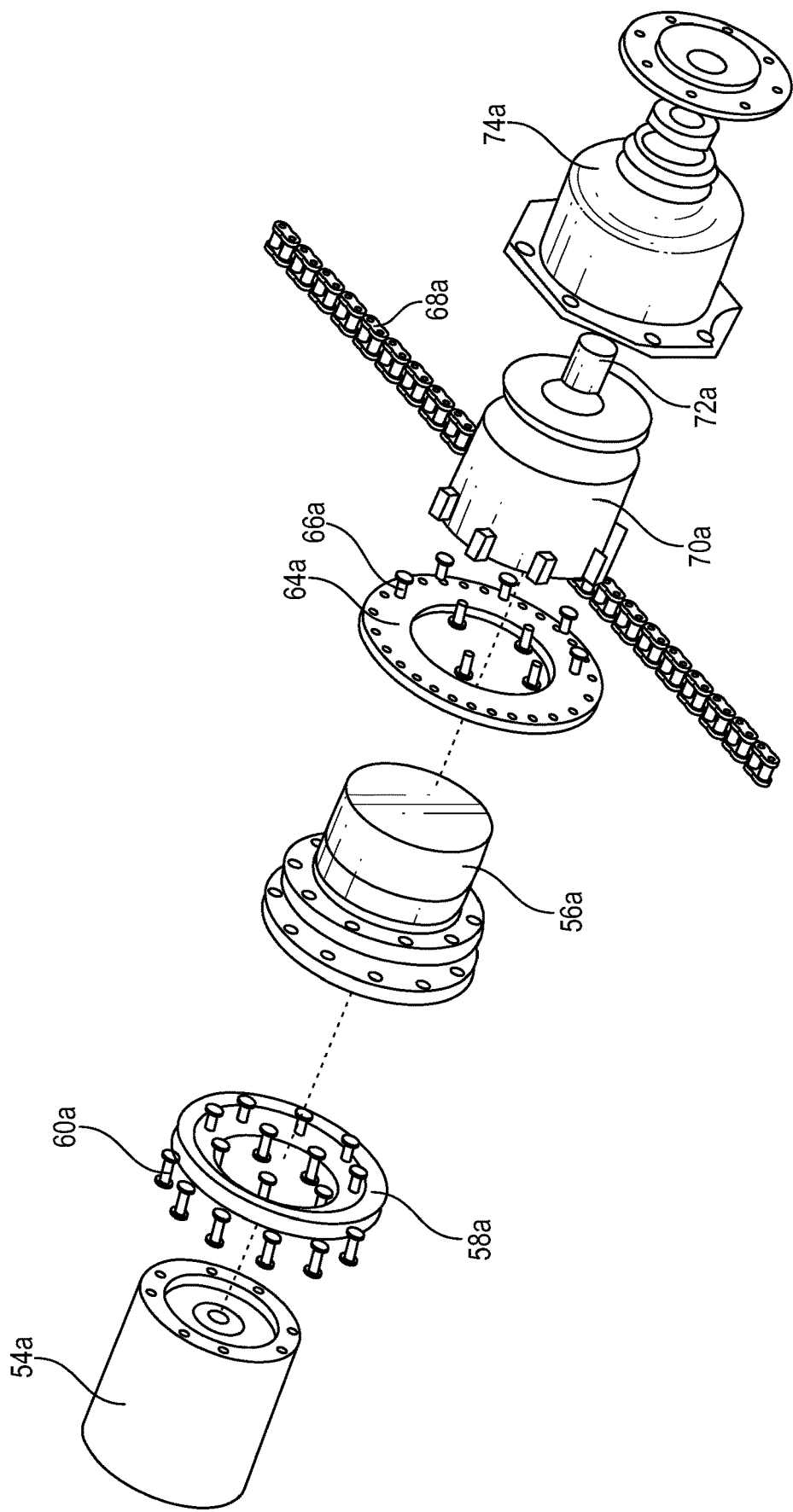
FIG. 5 is an exploded perspective view of the front axle of FIG. 4.
Figure 6:
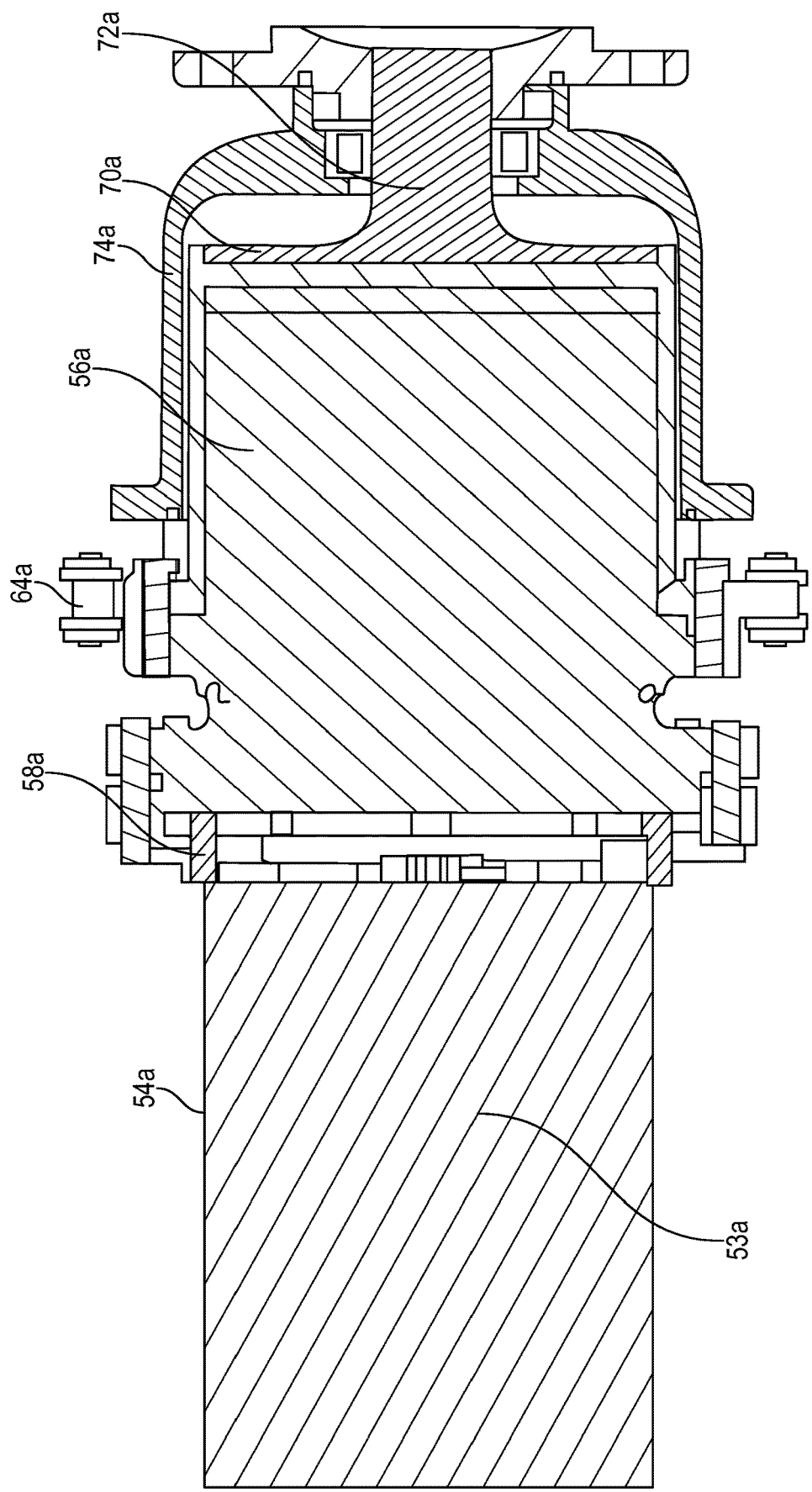
FIG. 6 is a cross-sectional view of the of the front axle of FIG. 4.
Figure 7:
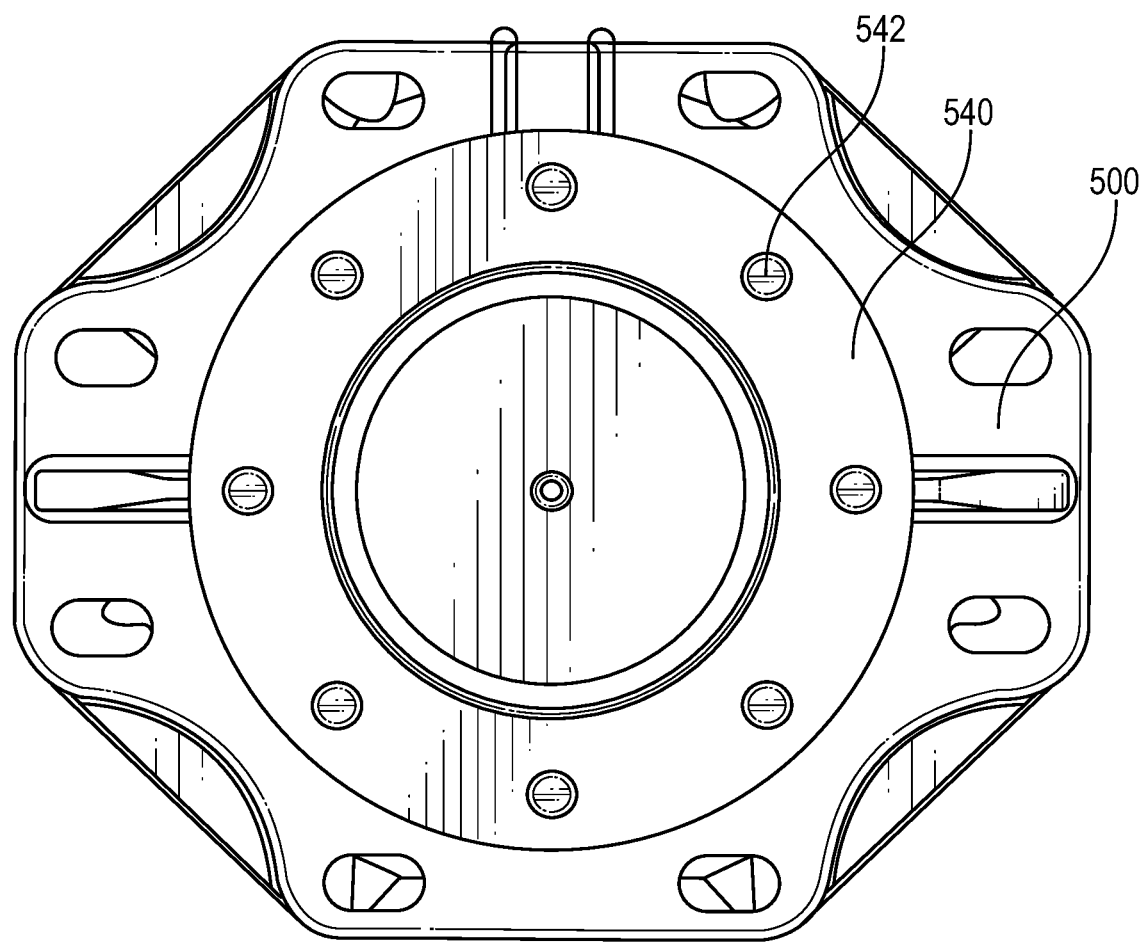
FIG. 7 is an end view of the rear axle of the first drive assembly of FIG. 3.
Figure 8:
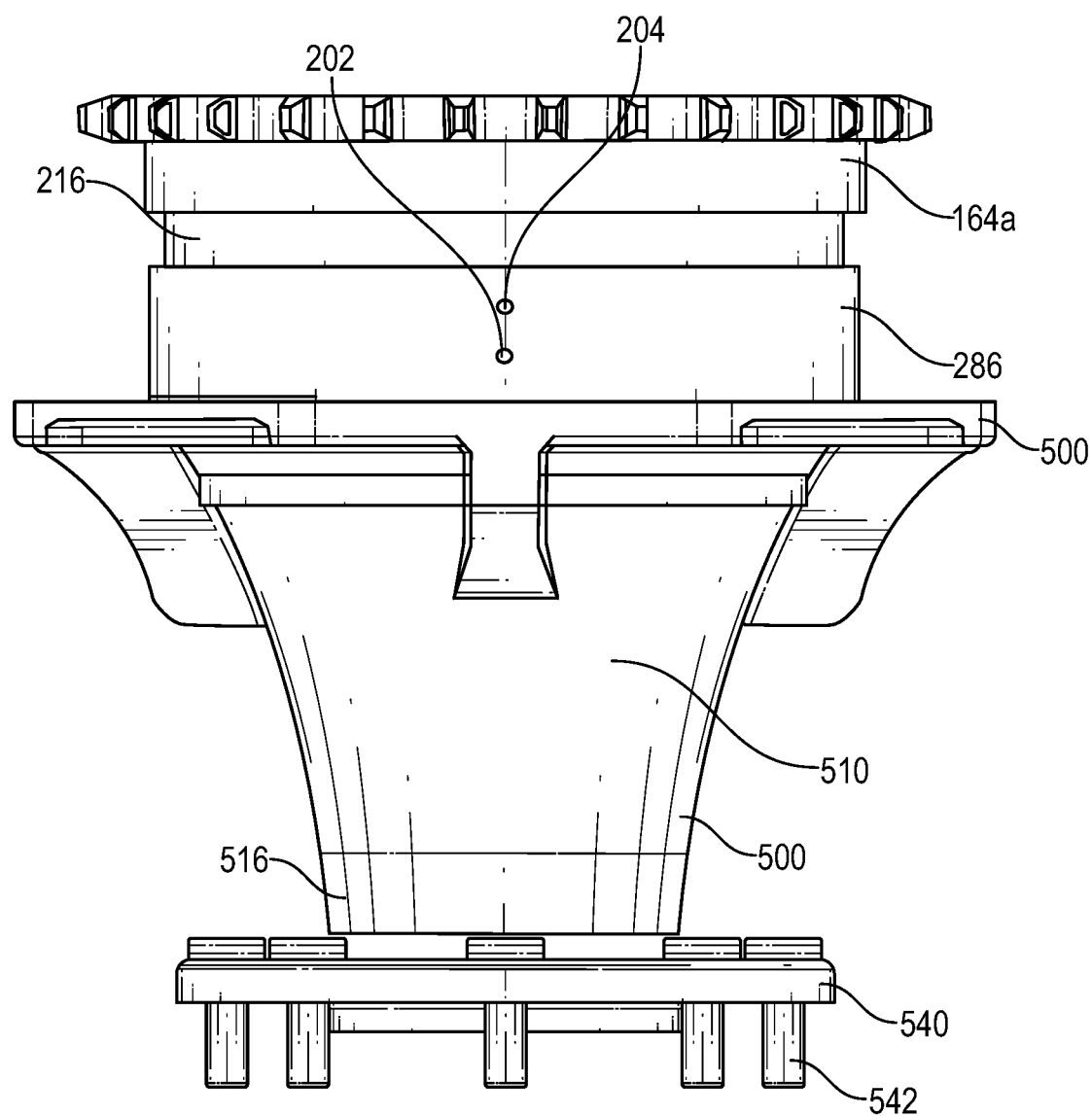
FIG. 8 is a top view of the rear axle of FIG. 7.
Figure 9:
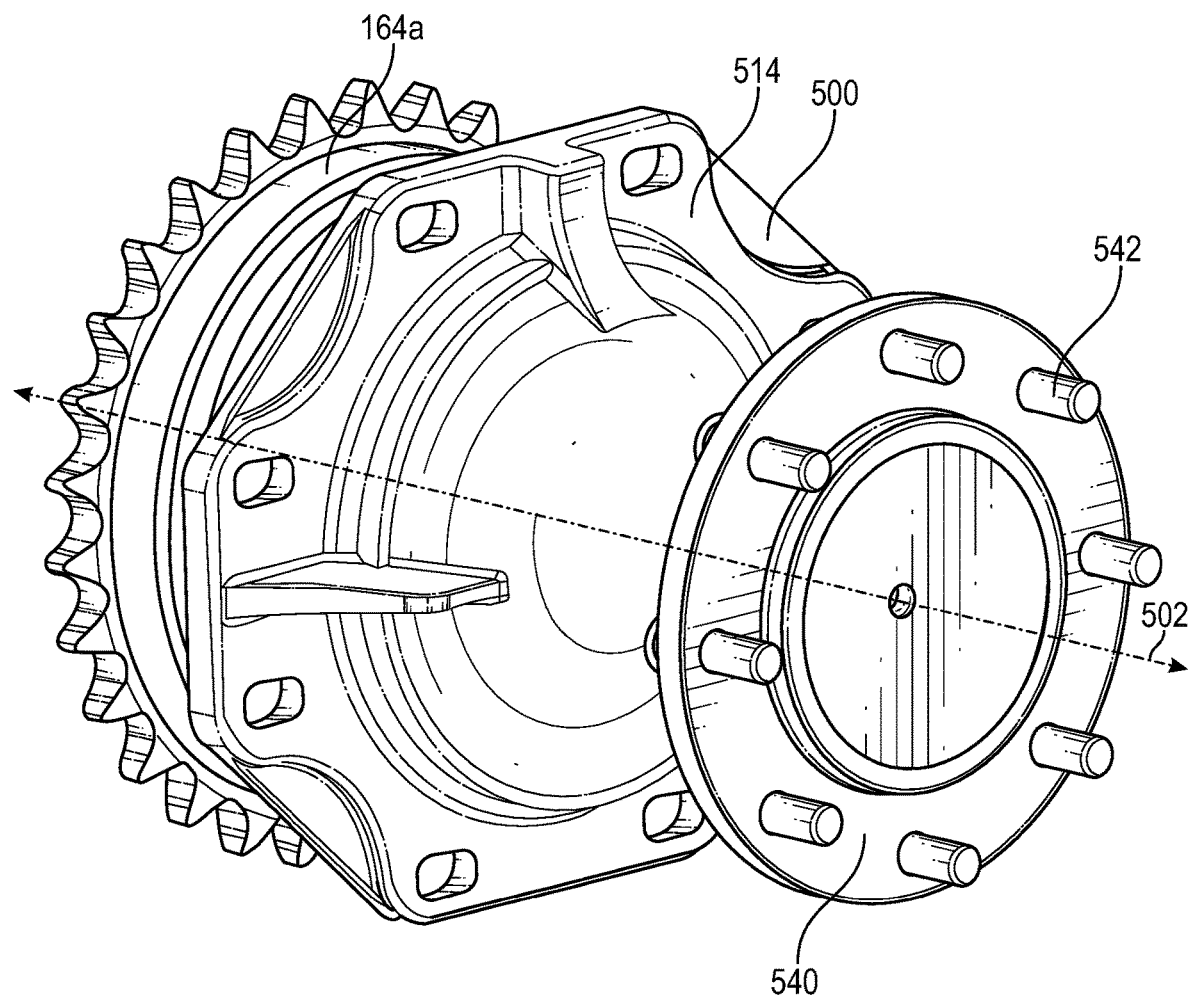
FIG. 9 is a front perspective view of the rear axle of FIG. 7.
Figure 10:
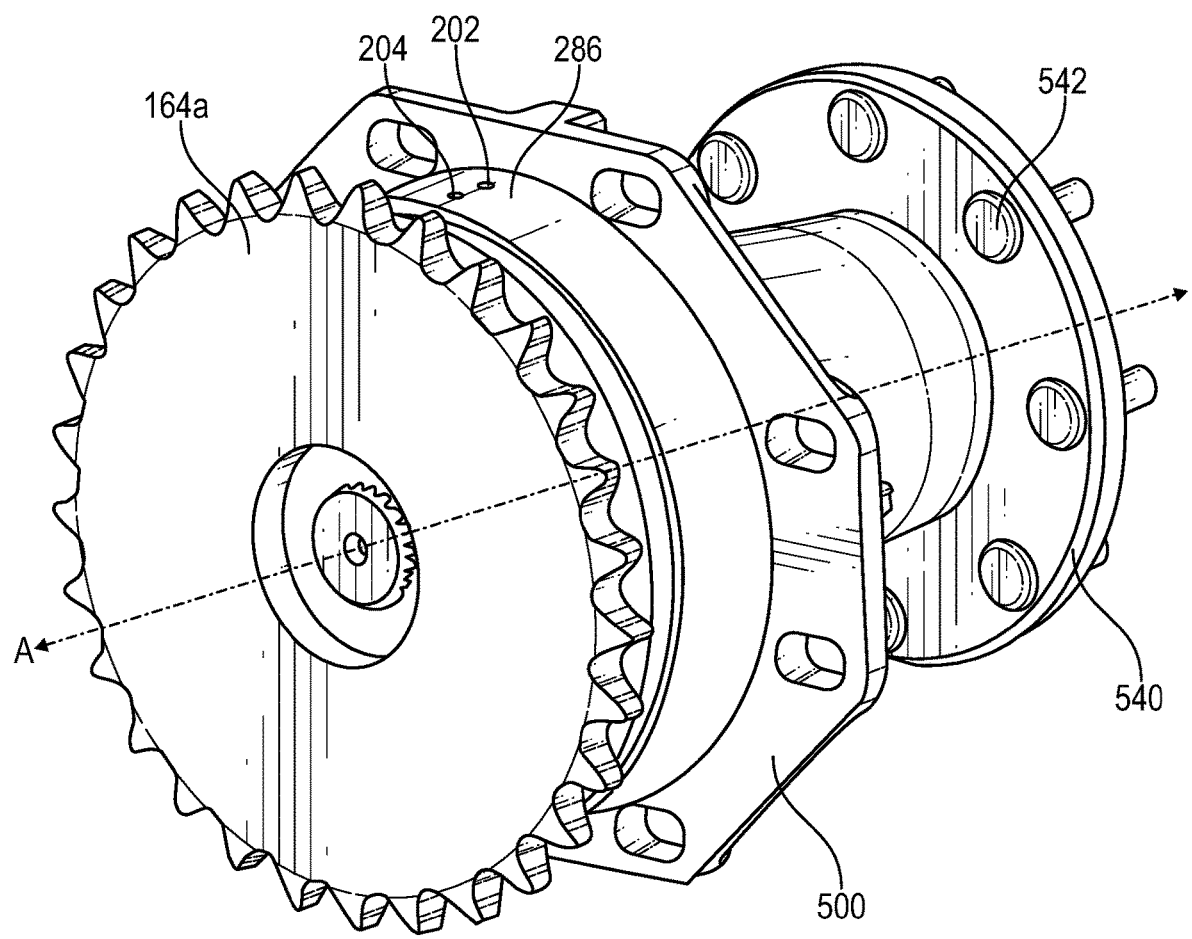
FIG. 10 is a rear perspective view of the rear axle of FIG. 7.
Figure 11:
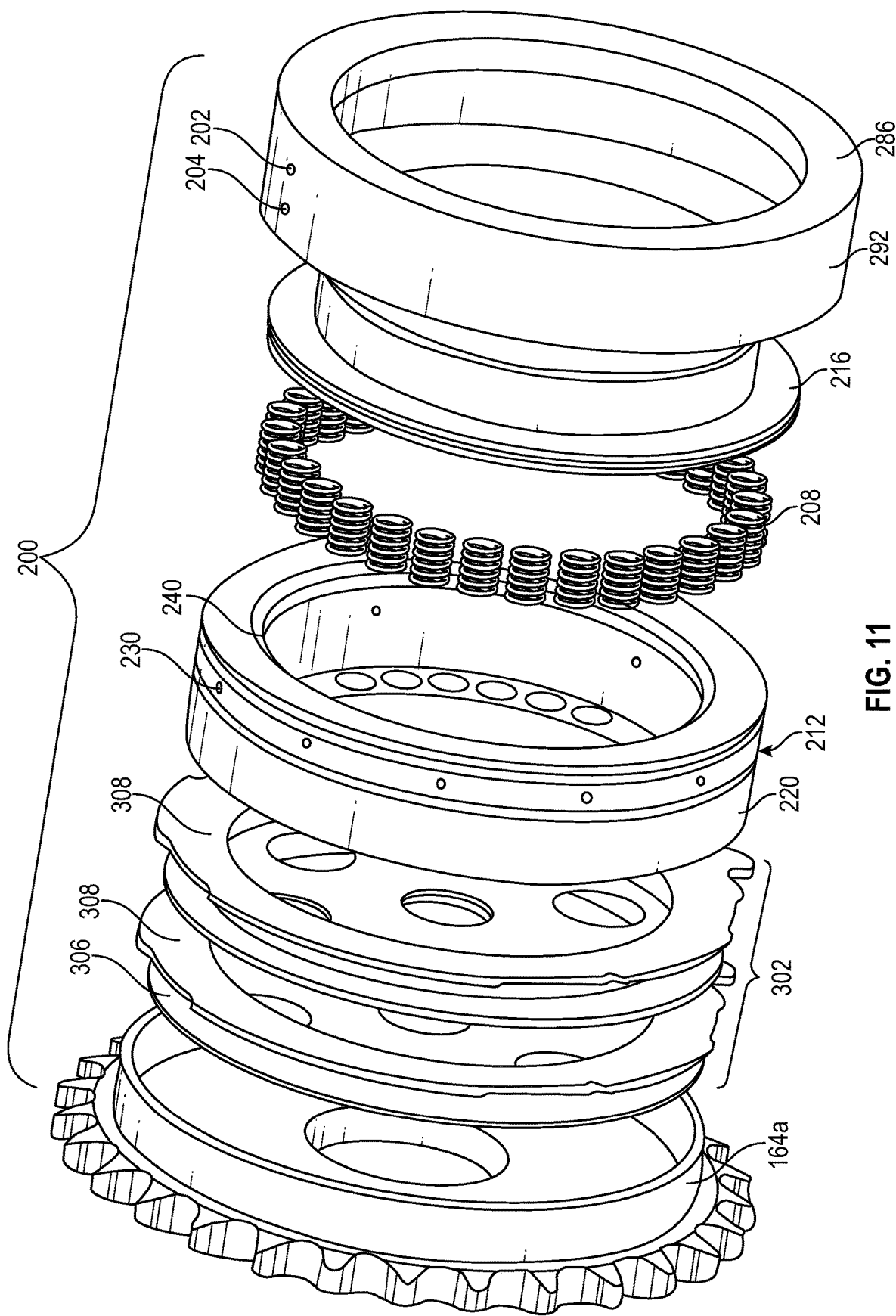
FIG. 11 is an exploded perspective view of the rear axle of FIG. 7.
Figure 12:
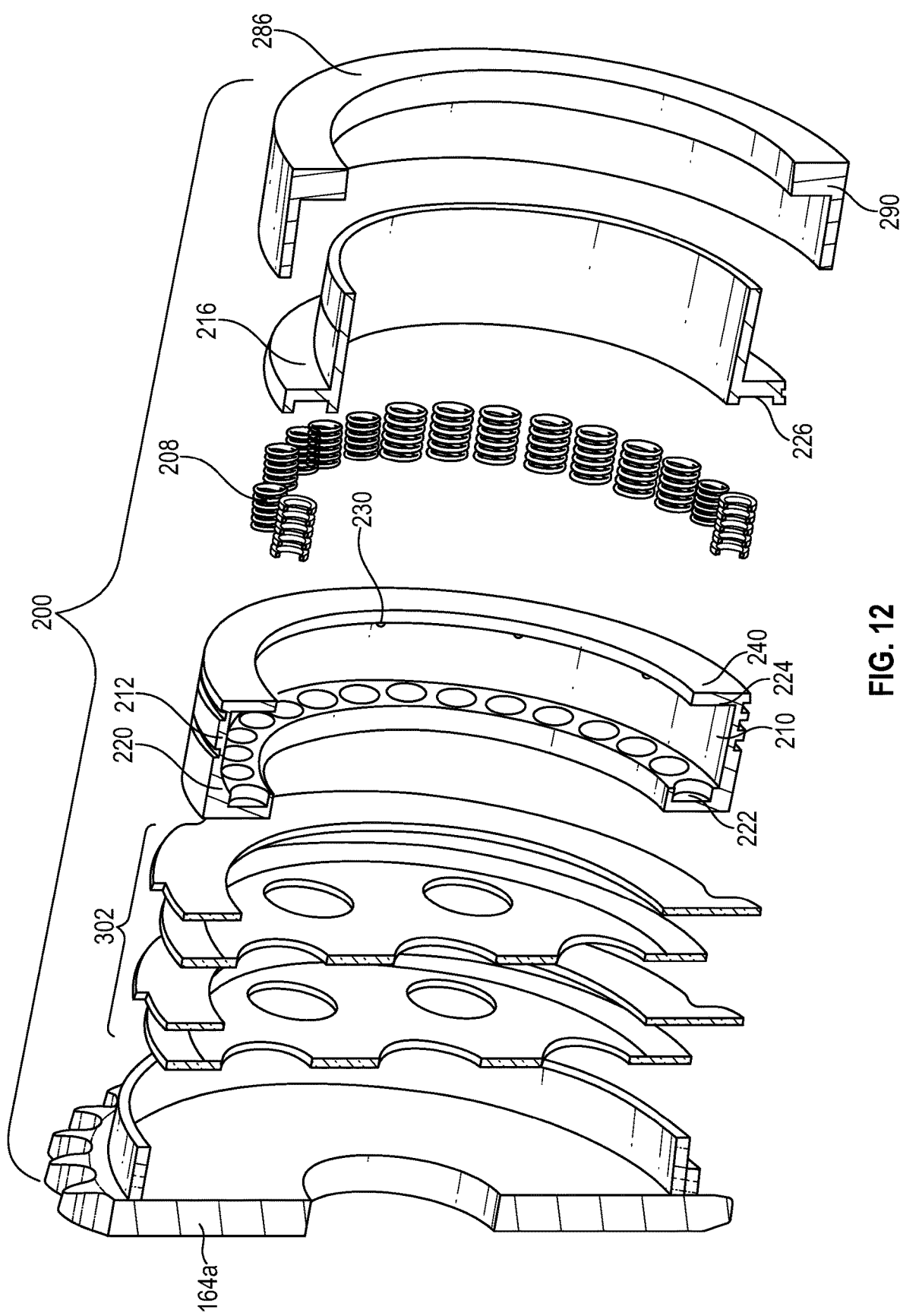
FIG. 12 is a cross-sectional exploded perspective view of the rear axle of FIG. 11.

Illustrated in FIGS. 2-3, the drive mechanism 14 of the loader 10 includes a first or left-side drive assembly 46a and a second or right-side drive assembly 46b (not illustrated). The second or right-side drive assembly 46b is similar to and includes the same elements as the first or left-side drive assembly 46a. Therefore, the second or right-side drive assembly 46b is not illustrated. During operation, each drive assembly 46a, 46b can be individually adjustable to produce different modes of operation or adjustable together to produce the same modes of operation.

Illustrated in FIGS. 2-6, the first drive assembly 46a includes a first or left electric motor 54a operably coupled to a first or left gear box 56a mounted on a left front axle 53a of the loader 10. An adapter plate 58a and fasteners 60a attach the first electric motor 54a to the first gear box 56a. In other embodiments, the first electric motor 54a is attached to the first gear box 56a in a different manner. In one embodiment, the first gear box 56 has a gear ratio of 30:1 but other gear ratios can be used with the present disclosure. The first gear box 56a is operably configured to engage a left front drive sprocket 64a to provide a first output. The left front drive sprocket 64a includes a plurality of teeth to engage a chain 68a that is configured to engage and drive a left rear drive sprocket 164a that in turn operates a rear left wheel or pneumatic tire (not shown). The left rear drive sprocket 164a includes a plurality of teeth that engage the chain 68a to enable the chain 68a to move or rotate the left rear drive sprocket 164a. The first gear box 56a is operably configured to engage a cast drive hub 70a to drive a front left axle and a front left wheel or pneumatic tire (not shown) to provide a second output. The cast drive hub 70a has a forged axle shaft 72a that is configured to engage a front wheel housing 74a to retain and operate the front left wheel or pneumatic tire. The front wheel housing 74a and the cast drive hub 70a are attached via bolts 66a to the first gear box 56a.

Figure 13:
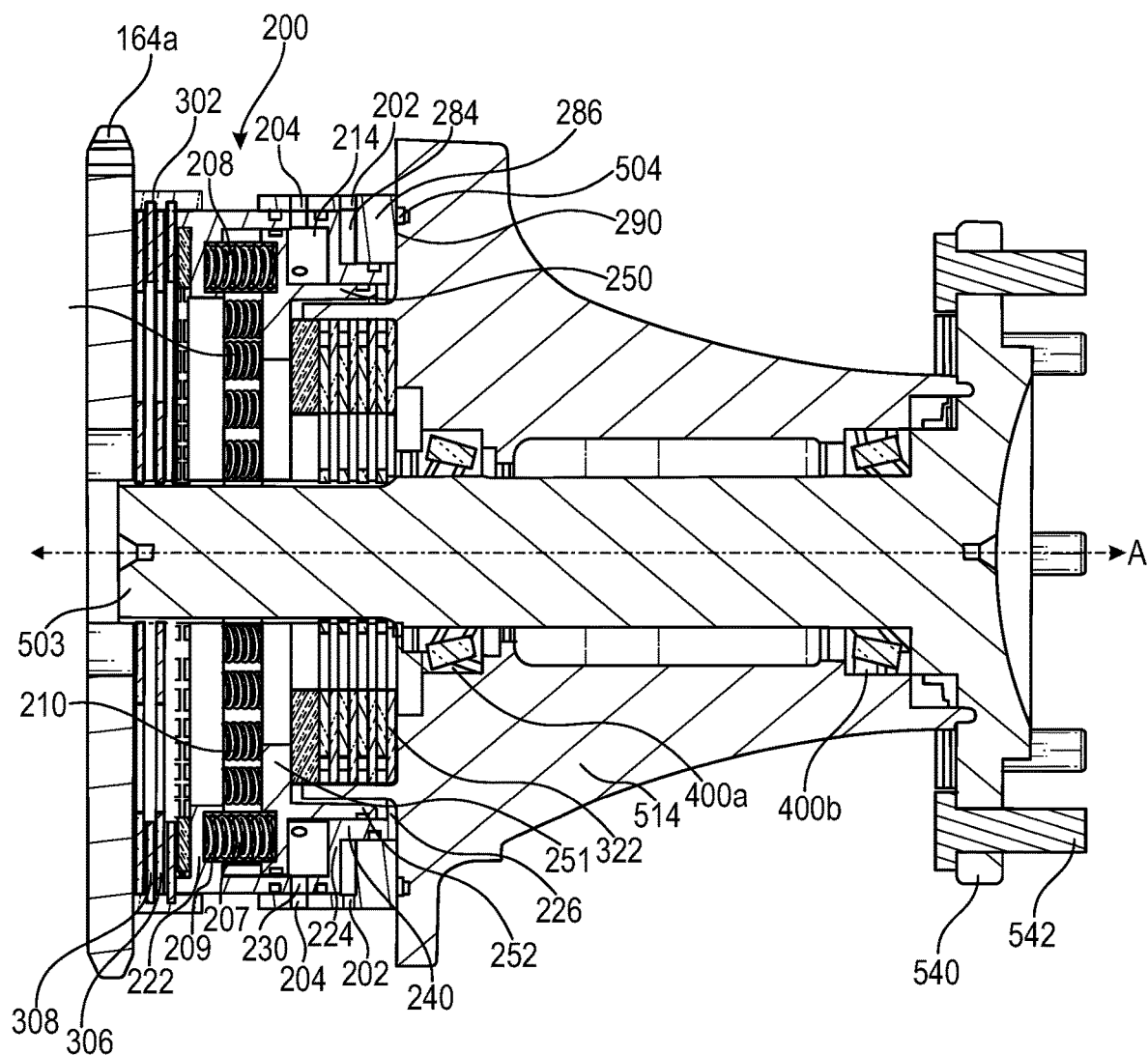
FIG. 13 is a partial cross-sectional view of the rear axle of FIG. 10.
Figure 14:
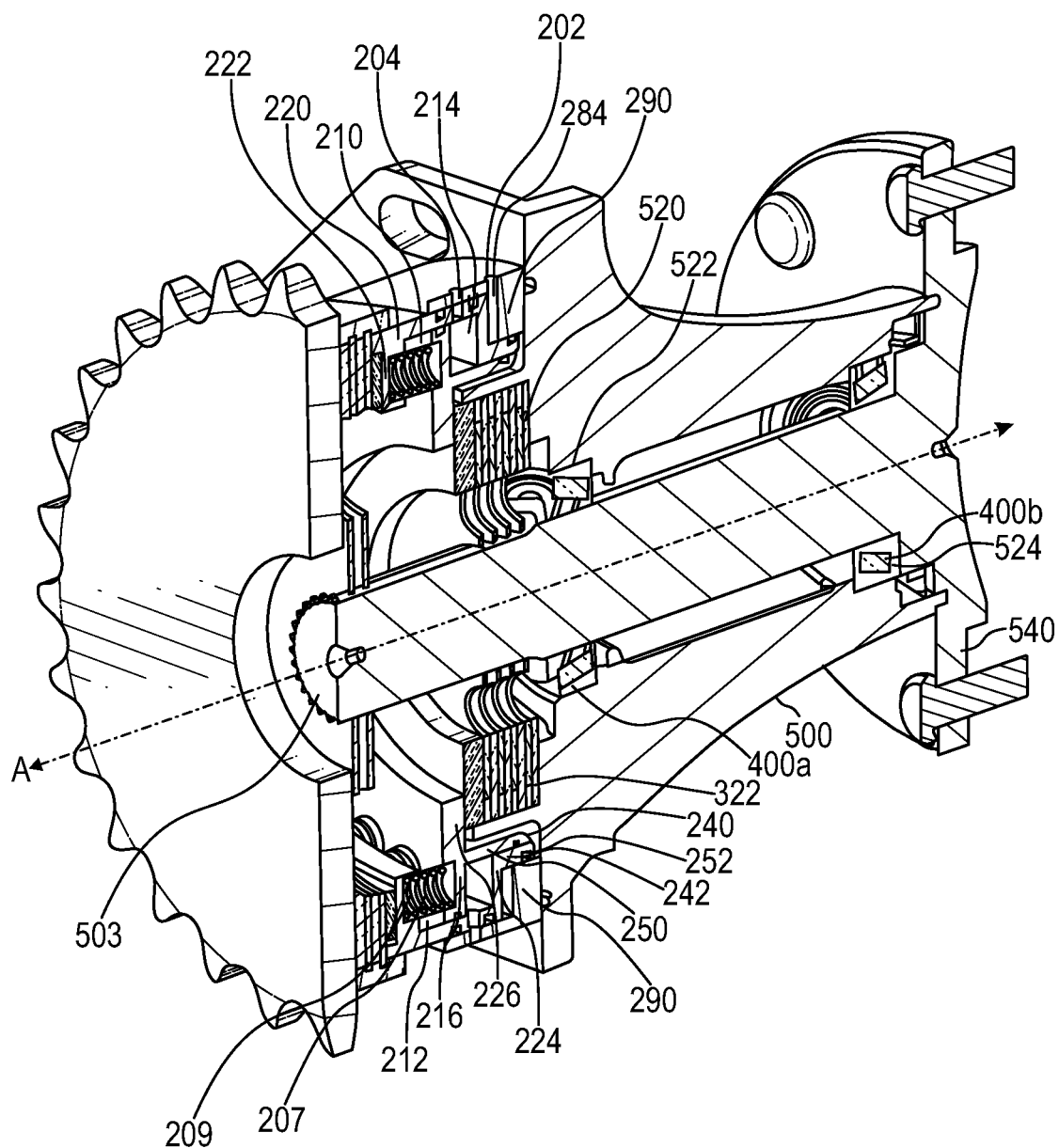
FIG. 14 is a partial perspective cross-sectional view of the rear axle of FIG. 10.
Figure 15:
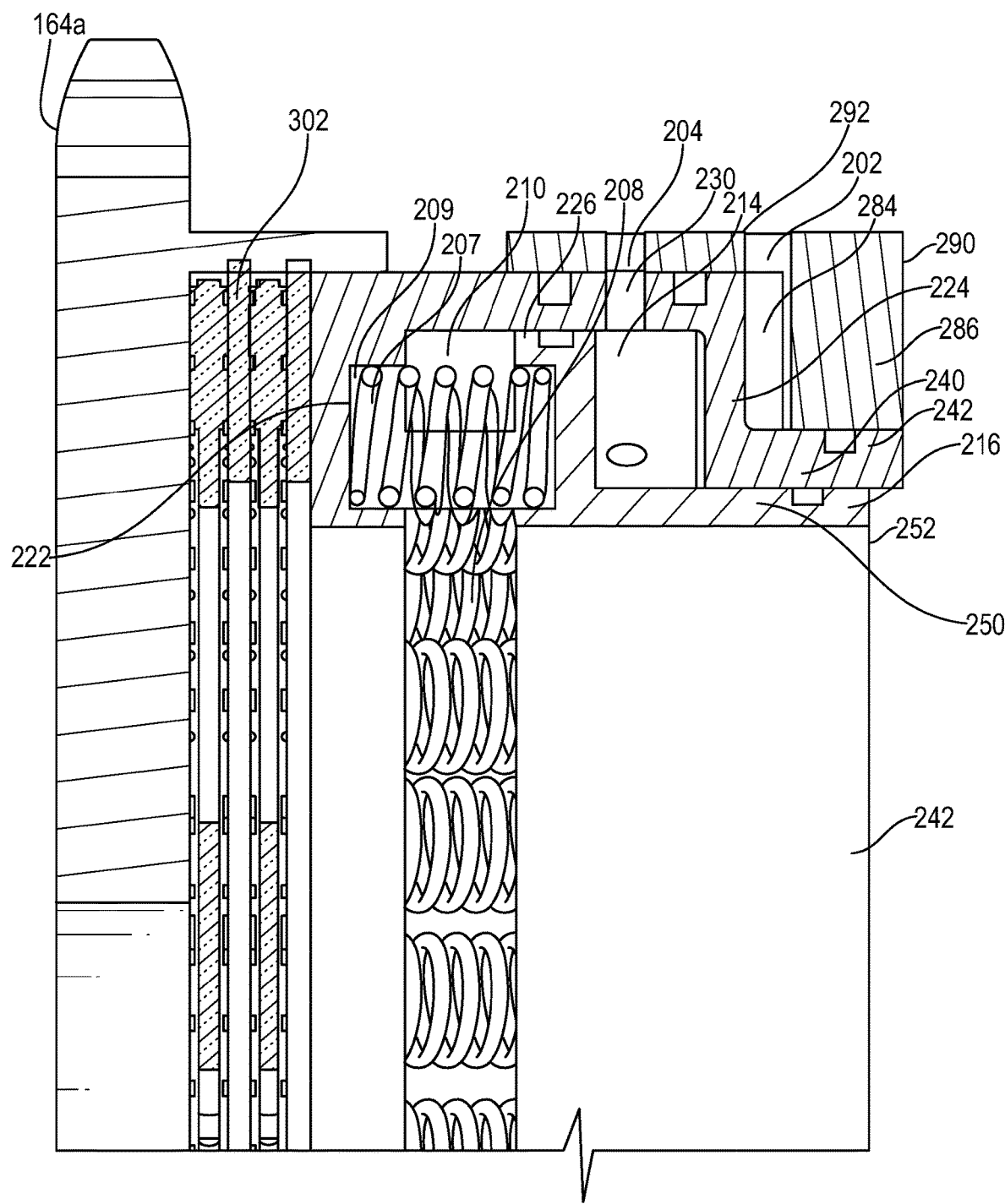
FIG. 15 is a partial cross-sectional view of the rear axle of FIG. 10.
Figure 16:
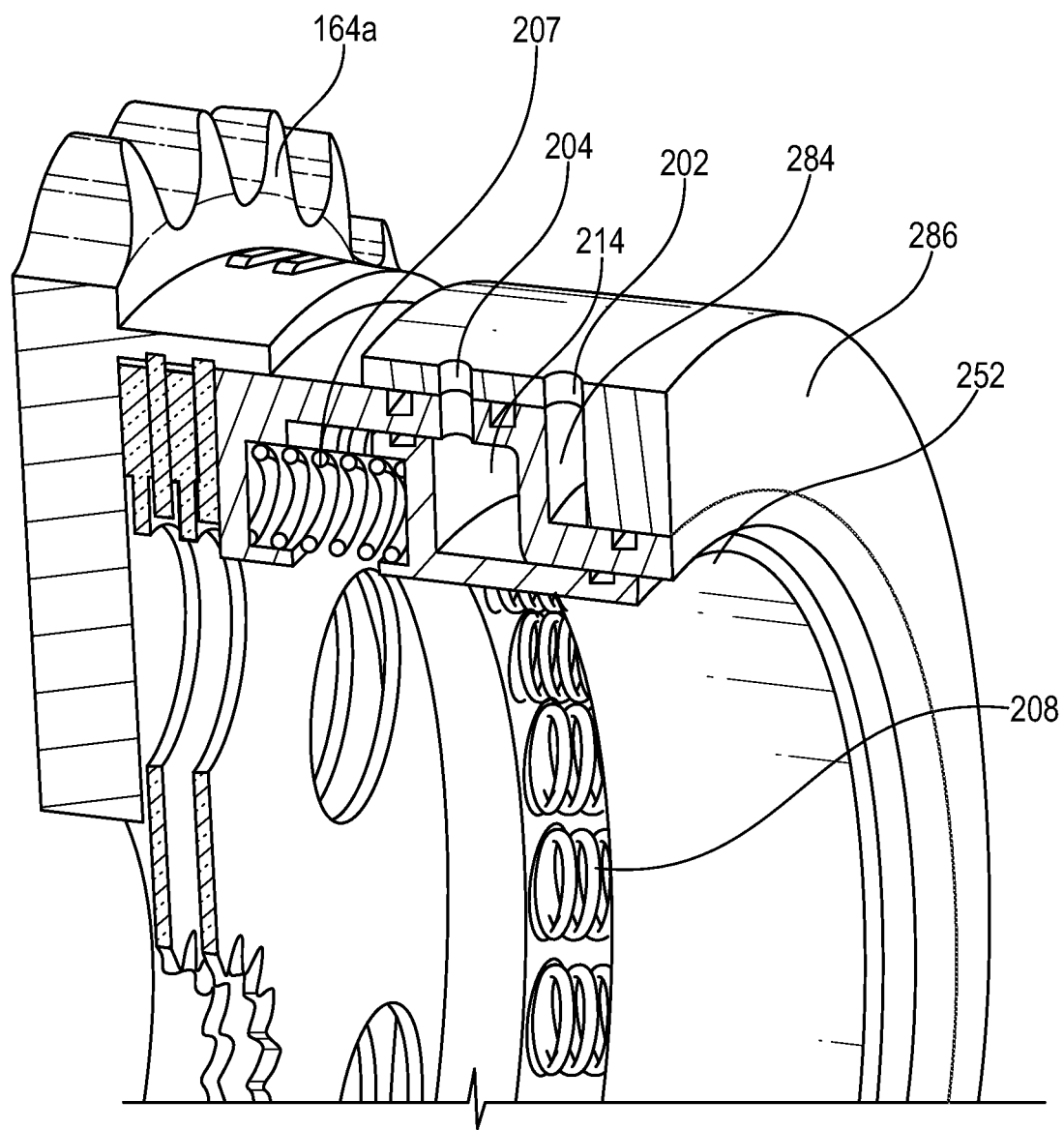
FIG. 16 is a partial cross-sectional perspective view of the rear axle of FIG. 10.

Illustrated in FIGS. 7-16, the first drive assembly 46a includes a rear clutch mechanism 200 that is configured to engage with one or more hydraulic hoses of a hydraulic system (not illustrated) that supply hydraulic fluid to a clutch apply port or valve 202 and a spring release port or valve 204. In FIG. 13, two of each of the clutch apply ports 202 and the spring release ports 204 are illustrated however additional ports 202 and 204 can be used. In FIG. 13, each of the clutch apply ports 202 is aligned with a second cavity 284, and each of the spring release ports 204 is aligned with a first spring housing hole or port 230 and a first cavity 214. Hydraulic fluid is supplied to the spring release port or valve 204 and/or the clutch apply port or valve 202 to produce different modes of operation for the first drive assembly 46a as the first and second cavities 214 and 284 are filled with the hydraulic fluid to create hydraulic pressure.

In mode one of operation, no hydraulic fluid or hydraulic pressure from the one or more hydraulic hoses is applied to the spring release port or valve 204 and the clutch apply port or valve 202 therefore the first and second cavities 214 and 284 remain empty. In mode one of operation, a first clutch pack 302 and a second clutch pack 322 are engaged with a rear axle shaft 503 of the rear axle 502 to restrict and prevent any movement of the rear axle 502 such that the loader 10 remains in a stationary or parked configuration. The first and second clutch packs 302 and 322 will fail safe into the engaged configuration if there is any sudden loss of hydraulic fluid and pressure in the first and second cavities 214 and 284.

In mode two, hydraulic fluid from the one or more hydraulic hoses is applied to the spring release port valve 204 but no hydraulic fluid is applied to the clutch apply port or valve 202 to result in a mode of operation wherein the second clutch pack 322 is released from engagement with the rear axle shaft 503 to enable front wheel drive of the loader 10. The first clutch pack 302 is not engaged with the rear axle shaft 503 of the rear axle 502 which enables front wheel drive via the chain 68a. In mode two of operation, the front left axle and the front left wheel or pneumatic tire are driven as desired by the operator of the loader 10. Mode two of operation enables better vehicle stability and reduced drag which can correlate to reduced load on the battery for the loader 10.

In mode three of operation, hydraulic pressure is applied to the spring release port valve 204 and to the clutch apply port or valve 202 to result in four wheel drive wherein the front wheels or tires and the rear wheels or tires are driven as desired by the operator of the loader 10. In mode three of operation, the second clutch pack 322 remains in an uncompressed configuration from mode two of operation. In mode three of operation, the first clutch pack 302 is now compressed to thereby transmit a force between the rear axle shaft 503 and the left rear drive sprocket 164a to enable four wheel drive of the loader 10. Modes one, two, and three of operation for the rear clutch mechanism 200 are discussed further below.

In one embodiment, mode three of operation includes two additional modes of operation which are medium and high. The medium mode of operation has a lesser amount of hydraulic fluid or pressure as compared to the high mode of operation that is applied to the clutch apply port or valve 202. In either the medium or high mode of operation, a high amount of the hydraulic fluid or pressure is applied to the spring release port or valve 204. Modes one and two of operation are similar to those described above. As can be appreciated in this embodiment, there are four modes of operation.

The rear clutch mechanism 200 includes a first spring 207 that is received in a first spring recess 209 and a second spring 208 that is received in a second spring recess 210 of a first spring housing 212. In mode one of operation, the first and second springs 207 and 208 press against the first and second spring housings 212 and 216 to separate or spread apart the first and second spring housings 212 and 216 relative to each other. The first and second springs 207 and 208 are compressed when hydraulic fluid is supplied to a first cavity 214 that is formed between the first spring housing 212 and a second spring housing 216 as in modes two and three of operation. When the first and second springs 207 and 208 are compressed, the first and second spring housings 212 and 216 are able to float or slide relative to each other and between a left rear drive sprocket 164a and an endcap housing 286 wherein both the left rear drive sprocket 164a and the endcap housing 286 are stationary relative to a centerline axis A of the rear axle 502.

The first and second spring housings 212 and 216 and the endcap housing 286 are annular in shape. The second spring housing 216 is configured to nest partially within the first spring housing 212 to form the first cavity 214 between the first and second spring housings 212 and 216. The first spring housing 212 is configured to nest partially within the endcap housing 286 to form a second cavity 284 between the first spring housing 212 and the endcap housing 286. The first and second spring housings 212 and 216 are arranged to slide relative to the endcap housing 286 when hydraulic fluid is supplied to the spring release port or valve 204 and enters the first cavity 214 in modes two or three of operation. In modes two or three of operation the compressive force is removed from a second clutch pack 322 as the second spring housing 216 moves away from the second clutch pack 322. The first spring housing 212 is arranged to slide relative to the endcap housing 286 to engage and compress a first clutch pack 302 when hydraulic fluid is supplied to the clutch apply port or valve 202 and the second cavity 284 that is between the first spring housing 212 and the endcap housing 286 in mode three of operation.

The first spring housing 212 includes a first annular wall 220 that extends between a first rim 222 and a second rim 224. The first annular wall 220 and the first and second rims 222 and 224 extend around a center axis of the first spring housing 212. The first annular wall 220 includes the second spring recess 210 wherein the second spring recess 210 has a diameter and a length that is sized to receive a second spring lip 226 of the second spring housing 216 and the second spring 208 therein. The first rim 222 is arranged and configured to receive and retain a first end portion of the first spring 207 therein. The second spring lip 226 is arranged and configured to receive and engage a second end portion of the first spring 207. When the first and second spring housings 212 and 216 are assembled together, the first spring recess 209 is formed between the first rim 222 and the second spring lip 226 to contain the first spring 207 therein. As such, the first spring 207 is retained between the first rim 222 and the second spring lip 226 in the first spring recess 209 wherein the first rim 222 and the second spring lip 226 compress the first spring 207 when hydraulic fluid is supplied to the first cavity 214 in modes two and three of operation. The first annular wall 220 includes a plurality of first spring housing holes or ports 230 wherein one of the first spring housing holes or ports 230 is arranged to align with one of the spring release port or valves 204 that is operably connected to a hydraulic hose to supply hydraulic fluid and pressure to the spring cavity 214.

The first spring housing 212 includes a second annular wall 240 having a length that extends from the second rim 224 to a second end 242. The second annular wall 240 extends around the center axis of the first spring housing 212. The length of the second annular wall 240 is sufficient to form an end of the second cavity 284 and to receive an endcap rim 290 of the endcap housing 286. The second end 242 aligns with an endcap rim 290 of the endcap housing 286. The endcap rim 290 has a width that is configured to assemble with the second annular wall 240 and form a first side of the second cavity 284. An opposite side of the second cavity 284 is formed by the second rim 224 when the first spring housing 212 is assembled with the endcap housing 286.

The second spring housing 216 includes a first annular wall 250 that extends from the second spring lip 226 to a second end 252. In the illustrated embodiment, the second end 242 of the first spring housing 212 extends past or overlaps the second end 252 of the second spring housing 216 when the first and second spring housings 212 and 216 are assembled together. The second spring housing 216 includes a second annular wall 251 that extends from the second spring lip 226 perpendicular to the first annular wall 250. The second annular wall 251 is positioned between the second spring 208 and the second clutch pack 322. The first annular wall 250 is engaged with and compresses the second clutch pack 322 when the first and second springs 207 and 208 are active, i.e., not compressed. When the second spring housing 216 moves away from the second clutch pack 322 to engage and compress the first and second springs 207 and 208, the second annular wall 251 compresses the first spring 207 and the second spring lip 226 compresses the second spring 208. As such, the second clutch pack 322 is no longer compressed and does not transmit force the rear axle shaft 503 so the second clutch pack 322 is in a disengaged configuration. The compression of the first and second springs 207 and 208, the movement of the first and second spring housings 212 and 216, and the release of compression on the second clutch pack 322 occur during modes two and three of operation.

The endcap housing 286 includes an endcap annular wall 292 having a length that extends from the endcap rim 290 towards the first rim 222. The endcap annular wall 292 includes two of the spring release ports or valves 204 and two of the clutch apply ports or valves 202. The endcap annular wall 292 can include any number of the spring release ports or valves 204 and the clutch apply ports or valves 202. In other embodiments, the endcap annular wall 292 includes one of the spring release ports or valves 204 and one of the clutch apply ports or valves 202. The endcap annular wall 292 extends around a center axis of the endcap housing 286. The endcap housing 286 is assembled with the first and second spring housings 212 and 216 such that the endcap housing 286 is in a fixed position relative to the first and second spring housings 212 and 216. The endcap housing 286 is assembled with the first and second spring housings 212 and 216 such that the spring release port or valve 204 is aligned with the first spring housing hole or port 230 and the first cavity 214. The endcap housing 286 is assembled with the first and second spring housings 212 and 216 such that the clutch apply port or valve 202 is aligned with the second cavity 284 that is between the second annular wall 240 and the second rim 224 of the first spring housing 212 and the endcap rim 290. The endcap housing 286 is mounted on an axle housing 500 of the rear axle 502 via one or more bolts or fasteners 504. In other embodiments, the endcap housing 286 can be mounted or attached to the rear axle 502 by different fastening mechanisms. In mode three of operation, when hydraulic fluid is supplied to the second cavity 284, the first spring housing 212 moves relative to the endcap housing 286 to compress the first clutch pack 302 to thereby compress the first clutch pack 302 to transfer force from the left rear sprocket 164a to the rear axle shaft 503 to enable four wheel drive of the loader 10.

The axle housing 500 is substantially conical in shape having an annular outer wall 510 that decreases in diameter as it extends axially away from a base 514 toward a distal end 516. The axle housing 500 includes a first bearing seat 520 sized to receive the second clutch pack 322 therein. The axle housing 500 includes a second bearing seat 522 sized to receive a first bearing 400a. The axle housing 500 includes a third bearing seat 524 sized to receive a second bearing 400b. The distal end 516 of the axle housing 500 is configured to engage a hub 540 of a rear left wheel or pneumatic tire (not shown) that is attached via one or more bolts or other fasteners 542 to the hub 540.

The rear clutch mechanism 200 includes the first clutch pack 302 that extends between the left rear drive sprocket 164a and the first rim 222 of the first housing 212. The first clutch pack 302 is in operable communication with the rear axle 502 and the left rear drive sprocket 164a to selectively transmit force therebetween. The first clutch pack 302 includes a plurality of clutch disks 306 coupled to and rotatable together with a rear axle shaft 503 of the rear axle 502, and a plurality of clutch plates 308 coupled to and rotatable together with the left rear drive sprocket 164a. When assembled, the clutch disks 306 and clutch plates 308 are stacked axially in an alternating pattern with the left rear drive sprocket 164a positioned on one end and the first rim 222 of the first housing 212 positioned on the other end.

During mode three of operation, the first clutch pack 302 is adjustable between an engaged configuration and a disengaged configuration by applying and removing a compressive force thereto. More specifically, applying a compressive force to the first clutch pack 302 (e.g., via the first rim 222) causes the clutch disks 306 and clutch plates 308 to frictionally engage one another and transmit a force between the rear axle shaft 503 and the left rear drive sprocket 164a. In contrast, removing the compressive force substantially eliminates the frictional engagement between the clutch disks 306 and the clutch plates 308 such that the first clutch pack 302 does not transmit force between the rear axle shaft 503 and the left rear drive sprocket 164a.

In mode one of operation, no hydraulic fluid is applied to the first and second spring cavities 214 and 284. As such, in mode one of operation, the first and second springs 207 and 208 are active and press against the first and second spring housings 212 and 216 to spread the first and second spring housings 212 and 216 apart from each other. In mode one of operation, the second spring housing 216 presses against the second clutch pack 322 in the engaged configuration such that the second clutch pack 322 transmits force to the rear axle shaft 503. In mode one of operation, the first spring housing 212 presses against the first clutch pack 302 in the engaged configuration such that the first clutch pack 302 transmits force between the rear axle shaft 503 and the left rear drive sprocket 164a. In mode one of operation, the first and second spring housings 212 and 216 apply a compressive force to the first and second clutch packs 302 and 322 such that the first and second clutch packs 302 and 322 are engaged with the rear axle 502 to thereby prevent movement of the rear axle 502 to act as a parking brake wherein the loader 10 remains fixed or stationary.

In mode two of operation, hydraulic fluid is applied to the spring release port or valve 204 to increase the hydraulic pressure in the first cavity 214. In mode two of operation, no hydraulic fluid is applied to the clutch apply port or valve 202 and the second cavity 284 therefore the first spring housing 212 does not compress the first clutch pack 302 and the four wheel drive remains off or unengaged. As hydraulic fluid and pressure increases in the first cavity 214, the second spring lip 226 and the second spring housing 216 move toward the left rear drive sprocket 164a to release any compressive force on the second clutch pack 322 by moving the second annular wall 251 away from the second clutch pack 322. Additionally, as the hydraulic fluid and pressure in the first cavity 214 increases, the first spring housing 212 moves toward the endcap housing 286 wherein the first rim 222 compresses the first spring 207 and the second spring 208. Additionally, as the first spring housing 212 moves away from the first clutch pack 302, any compressive force on the first clutch pack 302 is thereby released. As such, both the first and second springs 207 and 208 are compressed. In mode two of operation, the first and the second spring housings 212 and 216 are able to move towards each other and away from each other such as in a scissors movement, i.e., a back and forth movement. There is a first running clearance between the first spring housing 212 and the first clutch pack 302 and a second running clearance between the second spring housing 216 and the second clutch pack 322 in mode two of operation when the first cavity 214 is pressurized. In mode two of operation, the first and the second clutch packs 302 and 322 do not transmit force from the left rear drive sprocket 164a to the rear axle shaft 503 so the loader 10 is in a front wheel drive mode. The rear wheel is free to rotate but not separately driveable by the left rear drive sprocket 164a.

In mode three of operation, hydraulic fluid is still applied to the spring release port or valve 204 to maintain the hydraulic pressure in the first cavity 214 from mode two of operation. In mode three of operation, hydraulic fluid is also applied to the clutch apply port or valve 202 to increase the hydraulic pressure in the second cavity 284. As hydraulic pressure in the second cavity 284 increases, the first spring housing 212 moves toward the left rear drive sprocket 164a to compress the first clutch pack 302 to the engaged position wherein the first rim 222 presses against the clutch disks 306 and clutch plates 308 to frictionally engage one another and transmit a force between the rear axle shaft 503 and the left rear drive sprocket 164a. As such, the first clutch pack 302 is engaged and the loader 10 is in a four wheel drive configuration such that the rear axle shaft 503 can be driven by the left rear drive sprocket 164a.

To change from mode three to mode two of operation such that the loader 10 is in a front wheel drive mode, the compressive force on the first clutch pack 302 is removed and four wheel drive is prevented. Hydraulic fluid is removed or allowed to drain from the second cavity 284 to enable the first spring housing 212 and the second spring housing 216 to move away from the first clutch pack 302 and release the compressive force on the first clutch pack 302. The hydraulic fluid remains in the first cavity 214 as described above with respect to mode two.

To change from mode two to mode one of operation such that the loader 10 is in a parked configuration, hydraulic fluid is removed or allowed to drain from the first cavity 214 to enable the first and second springs 207 and 208 to become active. As the first and second springs 207 and 208 become active and the hydraulic pressure decreases in the first cavity 214, the first spring housing 212 moves toward and rests against the first clutch pack 302 and the second spring housing 216 moves toward and rests against the second clutch pack 322. The first and second clutch packs 302 and 322 are engaged by the first and second spring housings 212 and 216, respectively, and the first and second clutch packs 302 and 322 function as a parking brake and the loader 10 remains fixed or stationary. In mode one of operation, if the hydraulic fluid drains from the first and second cavities 214 and 284, then the first and second clutch packs 302 and 322 fail safe in an engaged position to function as a parking brake.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A rear clutch mechanism mounted on a rear axle shaft of a work vehicle, the rear clutch mechanism comprising:
a first clutch pack configured for operable engagement with the rear axle shaft;
a second clutch pack configured for operable engagement with the rear axle shaft;
a first spring housing assembled with a second spring housing, wherein the first and second spring housings are configured to move relative to each other, the first spring housing positioned adjacent the first clutch pack, the second spring housing positioned adjacent the second clutch pack;
a first cavity defined between the assembled first and second spring housings, the first cavity fluidly connected to a hydraulic hose to receive hydraulic fluid to increase hydraulic pressure therein; and
when the first cavity contains hydraulic fluid, the first spring housing moves away from the first clutch pack and the second spring housing moves away from the second clutch pack such that the first and second clutch packs are released from operable engagement with the rear axle shaft.

2. The rear mechanism of claim 1, wherein the first and the second spring housings together form a first spring recess configured to receive a first spring;
when the first cavity does not contain hydraulic fluid, the first spring is in an active state to push the first and second spring housings, respectively, against the first and second clutch packs, respectively, such that the first and second clutch packs are in operable engagement with the rear axle shaft; and
when the first cavity does contain hydraulic fluid, the first spring is compressed by the first and second spring housings.

3. The rear mechanism of claim 2, further comprising:
an endcap housing assembled with the first and the second spring housings, wherein the endcap housing defines a spring release port configured to receive hydraulic fluid from the hydraulic hose, the spring release port is fluidly connected to the first cavity.

4. The rear mechanism of claim 3, further comprising:
a second cavity defined between the second spring housing and the endcap housing, wherein the endcap housing defines a clutch apply port configured to receive hydraulic fluid from the hydraulic hose, the clutch apply port is fluidly connected to the second cavity; and
when the second cavity contains hydraulic fluid, the first spring housing compresses the first clutch pack such that the first clutch pack is in operable engagement with the rear axle shaft such that force is transmitted between the rear axle shaft and the first clutch pack.

5. The rear mechanism of claim 3, wherein the first and the second spring housings are configured to move relative to the endcap housing.

6. The rear mechanism of claim 2, further comprising:
wherein the first spring housing defines a second spring recess; and
a second spring is positioned in the second spring recess.

7. The rear mechanism of claim 6, wherein the first spring housing includes a first annular wall that extends between a first rim and a second rim, the first annular wall defines the second spring recess, wherein the first rim is arranged to engage the first clutch pack.

8. The rear mechanism of claim 6, wherein the second spring housing includes a first annular wall that extends perpendicular to a second annular wall, wherein the first annular wall includes a second rim, wherein the second rim is arranged to engage the first spring, and the first annular wall is arranged to engage the second clutch pack.

* * * * *